(12) United States Patent
Heath et al.

(10) Patent No.: US 7,680,311 B2
(45) Date of Patent: Mar. 16, 2010

(54) SYSTEM AID FOR DIGITAL RADIOGRAPHIC IMAGE QUALITY VERIFICATION

(75) Inventors: Michael D. Heath, Rochester, NY (US); Lynn M. Fletcher-Heath, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 998 days.

(21) Appl. No.: 11/403,397

(22) Filed: Apr. 13, 2006

(65) Prior Publication Data

US 2006/0233429 A1 Oct. 19, 2006

Related U.S. Application Data

(60) Provisional application No. 60/671,598, filed on Apr. 15, 2005.

(51) Int. Cl.
*G06K 9/00* (2006.01)
*B41M 5/00* (2006.01)
(52) U.S. Cl. .......................... 382/128; 382/255; 378/28
(58) Field of Classification Search ................. 382/100, 382/128, 129, 130, 131, 132, 133, 134, 162, 382/169, 172, 181, 189, 194, 209, 232, 255, 382/274, 276, 289, 305, 312; 378/28
See application file for complete search history.

(56) References Cited

U.S. PATENT DOCUMENTS 6,409,383 B1 6/2002 Wang et al.
6,639,966 B2 10/2003 Lautenschlager et al.
6,674,834 B1 1/2004 Acharya et al.
6,694,047 B1 * 2/2004 Farrokhnia et al. .......... 382/132

OTHER PUBLICATIONS

M. Thijssen et al., Comparison of the Detectability of Small Details in a Film-Screen and a Digital Mammography System by the Imaging of a New CDMAM-Phantom, M. Yaffe ed., Medical Physics Publishin~ of the 1WDM Worksho~ 666-672.*
M. Thijssen et al. A Definition of Image Quality: The Image Quality Figure, BIR Report 20, 1990, pp. 29-34.*
N. Karssemeijer et al., Determination of Contrast-Detail Curves of Mammography Systems by Automated Image Analysis, Digital Mammography 96' Proceedings of the 3rd International workshop on Digital Mammo a h , 1996, .155-160.*
N. Karssemeijer et al., Determination of Contrast-Detail Curves of Mammography Systems by Automated Image Analysis, Digital Mammography 96' Proceedings of the 3rd International workshop igital Mammon. 155-160.*
M. Thijssen et al., Comparison of the Detectability of Small Details in a Film-Screen and a Digital Mammography System by the Imaging of a New CDMAM-Phantom, M. Yaffe ed., Medical Physics Publishing, Proceedings of the IWDM Workshop, Jun. 2000, pp. 666-672.

(Continued)

*Primary Examiner*—Seyed Azarian

(57) ABSTRACT

A computerized method to aid in human visual reading of phantom image data for task-based image quality assessment. A digital image is registered to a phantom template to generate a plurality of individual targets. The individual targets are sequentially displayed to a user for visual assessment. A display control adjustment is provided for each of the displayed individual targets. The user then indicates at least one assessment of the displayed individual target, and the assessments for all the plurality of targets is stored for analysis. In one arrangement, the individual targets are randomly rotated prior to being sequentially displayed.

11 Claims, 4 Drawing Sheets

OTHER PUBLICATIONS

R. van Engen et al., Quality Control of the Physical and Technical Aspects of Mammography Screening, Part B: Digital Mammography, 4th Edition, Luxembourg: European Commission, 2006, www.euref.org, ISBN 92-79-01258-4.

A. Rose, Vision Human and Electronic, Plenum Press-New York, 1973, ISBN 0-306-30732-4.

British Standards Catalog, BS EN 62220-1:2004, International Electrotechnical Commission, Medical Electrical Equipment-Characteristics of Digital X-ray Imaging Devices—Part 1: Determination of the Detective Quantum Efficiency, 2003.

P. Sharp et al., ICRU Report 54 International Commission on Radiation Unit, Medical Imaging—The Assessment of Image Quality, Dec. 1995, p. 15.

Ruben Rico et al., Automatic Scoring of CDMAM: A Dose Study, Proc. SPIE, vol. 5034, 2003, pp. 164-173.

N. Karssemeijer et al., Determination of Contrast-Detail Curves of Mammography Systems by Automated Image Analysis, Digital Mammography 96' Proceedings of the 3rd International workshop on Digital Mammography, 1996, pp. 155-160.

K. Bijkerk et al., Modification of the CDMAM Contrast-Detail Phantom for Image Quality Evaluation of Full-Field Digital Mammography Systems, University Medical Cente, IWDM 2000 Report, pp. 630-640.

R. Visser and N. Karsseijer, CDCOM Manual, http:www.euref.org.

A. E. Burgess, Comparison of Receiver Operating Characteristic and Forced Choice Observer Performance Measurement Methods, Med. Phys. 22 (5), May 1995, pp. 643-655.

M. Tapiovaara et al., How Should Low-Contrast Detail Detectability be Measured in Fluoroscopy?, Med. Phys. 31 (9), Sep. 2004, pp. 2564-2576.

R. F. Wagner et al., Signal Detection Theory and Medical Image Assessment, Recent Developments in Digital Imaging, ed.-American Institute of Physics, 1985, pp. 39-59.

T. Fearon, A Comparison Evaluation of Rare-Earch Screen-Film Systems: System Speed, Contrast, Sensitometry, RMS Noise, Square-Wave Response Function, and Contrast-Dose-Detail Analysis, Invest. Radiol. 21, 1986, pp. 654-662.

G. Cohen et al., Analysis of Variations in Contrast-Detail Experiments, Med. Phys. 11 (4), Jul./Aug. 1984, pp. 469-473.

R. Visser and N. Karsseijer, CDCOM Manual, http:www.euref.org (2003).

L-N. D. Loo et al., An Empirical Investigation of Variability in Contrast-detail Diagram Measurements, Proc. SPIE vol. 419., Apr. 1983, pp. 68-76.

S. R. Thompson et al., A Phantom for the Measurement of Contrast Detail Performance in Film-Screen Mammography, The British Journal of Radiology, vol. 64 No. 767, 1991, pp. 1049-1055.

* cited by examiner

SYSTEM AID FOR DIGITAL RADIOGRAPHIC IMAGE QUALITY VERIFICATION

CROSS REFERENCE TO RELATED APPLICATIONS

Reference is made to, and priority is claimed from, U.S. Ser. No. 60/671,598, filed as a provisional patent application on Apr. 15, 2005, entitled "SYSTEM AID FOR DIGITAL RADIOGRAPHIC IMAGE QUALITY VERIFICATION", in the names of Heath et al., and which is commonly assigned.

FIELD OF THE INVENTION

This present invention relates generally to radiography, and more particularly to an image analysis and presentation system for reading an image signal of a test phantom, detecting target boundaries, isolating phantom image components, calculating image statistics, rendering each component optimally for human observation, and recording human observations.

BACKGROUND OF THE INVENTION

Radiography refers to a general system, or modality, for recording a radiation image from the transmission of x-rays through an object, such as a body of a patient. Conventional radiography uses a film/screen combination as the capture device, while digital radiography can employ a digital detector (DR) or a stimulable phosphor plate (generally referred to as computed radiography, CR). For either digital radiography technology, the output digital signal is usually converted into a unit that is linear with the logarithm of incident exposure. Digital systems can record radiation exposure over a wide dynamic range, typically on the order of 10,000:1, so that exposure error is seldom a problem.

As with conventional radiography, equipment acceptance and continued quality assurance are required for digital radiography systems, to varying degrees, for each diagnostic institution and/or region.

For example, guidelines for acceptance and scheduled testing of mammography systems have been outlined in the European Protocol for the Quality Control of the Physical and Technical Aspects of Mammography Screening, Part B: Digital Mammography, also generally referred to as EPQCM. Refer to R. van Engen, K. Young, H. Bosmans, and M. Thijssen, European Protocol for the Quality Control of the Physical and Technical Aspects of Mammography Screening, Part B: Digital Mammography, Draft Edition January 2005, European Commission, National Expert and Training Centre for Breast Cancer Screening 451, University Medical Centre Nijmegen, P.O. Box 9101, 6500 HB Nijmegen, The Netherlands Nijmegan, The Netherlands, January 2005.

One image quality criterion prescribed by the EPQCM addresses the requirement that low-contrast small-diameter objects be visibly differentiated from a uniform background. This stands as a surrogate for the requirement for diagnostic systems to provide adequate visibility of masses and microcalcifications. Contrast-detail studies have traditionally been used for this purpose. See for example, A. Rose, *Vision Human and Electronic*, Plenum Press, New York (1973); M. Thijssen et al., "A definition of image quality: the image quality figure," BIR Report 20, pp 29-34 (1990); S. R. Thompson and K. Faulkner, "A phantom for the measurement of contrast detail performance in film-screen mammography," British J. Radiol. 64, 1049-1055 (1991); L-N. D. Loo, K. Doi, M. Ishida, C. E. Metz, "An empirical investigation of variability in contrast-detail diagram measurements," Proc SPIE 419, 68-76 (1983); G. Cohen, D. L. McDaniel and L. K. Wagner, "Analysis of variations in contrast-detail experiments," Med. Phys. 11, 469-473 (1984); and T. Fearon et al. "A comparison evaluation of rare-earth screen-film systems: system speed, contrast, sensitometry, RMS noise, square-wave response function and contrast-dose-detail analysis," Invest. Radiol. 21, 654-662 (1986).

The EPQCM recognizes the well-known limitations of traditional contrast-detail methods, based on a single image of a Rose-Burger phantom, by adopting multiple images of an alternative forced-choice phantom. (See R. F. Wagner, C. E. Metz and D. G. Brown, "Signal detection theory and medical image assessment," in *Recent developments in digital imaging*, ed. K. Doi, L. Lanzl and P-J. P. Lin, AAPM Monograph 12, American Institute of Physics (1985).) This choice is supported by a recent comparison of subjective and objective measures of detail detectability as well as detailed analysis of the efficiency of multiple-forced-choice methods. Refer to M. J. Tapiovaara and M. Sanborg, "How should low-contrast detectability be measured in fluoroscopy," Med. Phys. 31, 2564-2576(2004). Refer also to A. E. Burgess, "Comparison of receiver operating characteristic and forced choice observer performance measurement methods," Med. Phys. 22, 643-655 (1995).

The EPQCM methodology is described in detail in section 2.4.1 (threshold contrast sensitivity) of the EPQCM. In particular, images of a suitable contrast-detail phantom are to be acquired with clinical technique factors. Visual scoring and analysis predicts the threshold contrast target for each target diameter.

The CDMAM phantom template employs a plurality of squares, wherein each square contains two identical discs (same thickness, same diameter), one in the center and one in a randomly chosen corner.

With the CDMAM phantom (i.e., contrast-detail phantom for mammography images), the threshold contrast of an imaging system is determined as a function of object diameter by the detection of pairs of low-contrast objects. The most recent version of the phantom, CDMAM 3.4, tests the ability of observers to visualize gold disks ranging in diameter from about 0.06 to about 2.0 mm and in thickness from about 0.03 to about 2.0 um. Refer to R. Visser and N. Karssemeijer, "CDCOM Manual: software for automated readout of CDMAM 3.4 images". Note that the CDCOM software, manual and sample images are posted at http:www.euref.org.

This results in an approximate radiation contrast range of about 0.5% to about 30%. K. R. Bijkerk, M. A. O. See Thijssen, Th. J. M. Arnoldussen, IWDM 2000 report: Modification of the CDMAM contrast-detail phantom for image quality of Full Field Digital Mammography systems, University Medical Centre Nijmegan, St. Radboud, The Netherlands, 2000. The contrast range is approximate, which is due to the clinical variability of the technique (filtration, kVp, and detector material) used for testing. The CDMAM 3.4 phantom was redesigned from older versions specifically to accommodate digital systems that potentially have improved-system DQE and MTF over traditional film screen systems. See M. A. O. Thijssen, W. Veldkamp, R. Van Engen, M. Swinkels, N. Karssemeijer, J. Hendricks, "Comparison of the detectability of small details in a film-screen and a digital mammography system by the imaging of a new CDMAM-phantom", *Proceedings of IWDM* 2000, pp. 666-672, M. Yaffe ed, Medical Physics Publishing, Madison, Wis., Toronto, 2000.

Although not permitted by the EPQCM guidelines, automated software observers have been developed to evaluate CDMAM images. One of these was developed by Karssemeijer and Thijssen. Refer to N. Karssemeijer, M. A. O. Thijssen, "Determination of contrast-detail curves of mammography systems by automated image analysis"in Digital Mammography '96. Proceedings of the 3rd International Workshop on Digital Mammography, 155-160 (1996). It is believed to be available on the EUREF website (http:www.euref.org) along with a manual.

Other automated scoring methods continue to be developed in recognition of the complexities associated with implementing the visual threshold contrast sensitivity test. For example, Rico et al. implemented a software scoring method that they compared with visual measurements as a function of dose. (See R. Rico, S. Muller, G. Peter, A. Noël, and J. Stines, "Automatic scoring of CDMAM: A dose study," Proc. SPIE 5034, 164-173 (2003).) Although a good correlation of IQF (a summary performance measure) was reported, the software method demonstrated higher detection sensitivity than that of the human observers in the study. The use of the IQF metric precludes analysis of their data in terms of the EPQCM criteria.

Other analytical approaches are being investigated and may be promising. Ongoing work in IEC working group 62B is working to standardize the measurement of mammographic DQE in a manner similar to the current standard for general radiography. (See: "Medical electrical equipment—Characteristics of digital X-ray imaging devices—Part 1: Determination of the detective quantum efficiency" IEC 62220-1 Ed. 1, International Electrotechnical Commission (2003).) Such measurements can be used together with well-established methods to predict signal-to-noise performance metrics for either ideal or human observers. (See P. Sharp et al. "Medical imaging—the assessment of image quality," ICRU Report 54, International Commission on Radiation Unit, Bethesda, Md. (1995).)

Work is also currently underway in several laboratories to produce a software scoring tool that matches human visual performance.

At present, the EPQCM is being used as a guideline and is not used as a regulatory document. It is, however, anticipated that region specific regulations may be implemented based on the guidance of the EPQCM. Therefore, some clinical sites are beginning to require compliance with the EPQCM guidelines for equipment-purchase tenders.

Therefore, there exists a need for a tool to aid in the cumbersome and time-consuming image quality test, without compromising the requirement for human observers to complete the test.

The present invention is directed to a method to aid in the image quality test, without compromising the requirement for human observers to complete the test.

SUMMARY OF THE INVENTION

An objective of the present invention is to provide a method for optimal presentation of phantom images required to complete contrast-detail sensitivity tests. The present invention allows the processing of raw digital X-ray image signals for presentation to a human observer which promotes visual information to be conveyed.

According to the present invention, the image rendering system comprises an image analysis and rendering algorithm operating on an X-ray phantom image acquired with a digital imaging modality.

The present invention provides some advantages. For example, the invention is intended to provide a mechanism for analyzing a phantom image and further isolating each target to be read by a human observer. The method renders each individual target area based on its own characteristics, thereby reducing the time required to optimize each target manually. The method can randomly rotate each isolated target so as to reduce the probability of observer memorization of the target positions. Options can be applied to each target area, such as: dynamic range compression or expansion, brightness shift, or grey-scale inversion for optimal viewing. Human observer feedback can be captured, in a quick and precise manner, so as to reduce the time required to complete the task and reducing potential confusion of manual transcription. Automated traversal through the target can be accomplished, thereby alleviating the need to manually pan through target areas or display the full target at one time.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE PREFERRED EMBODIMENTS

Figure 1:
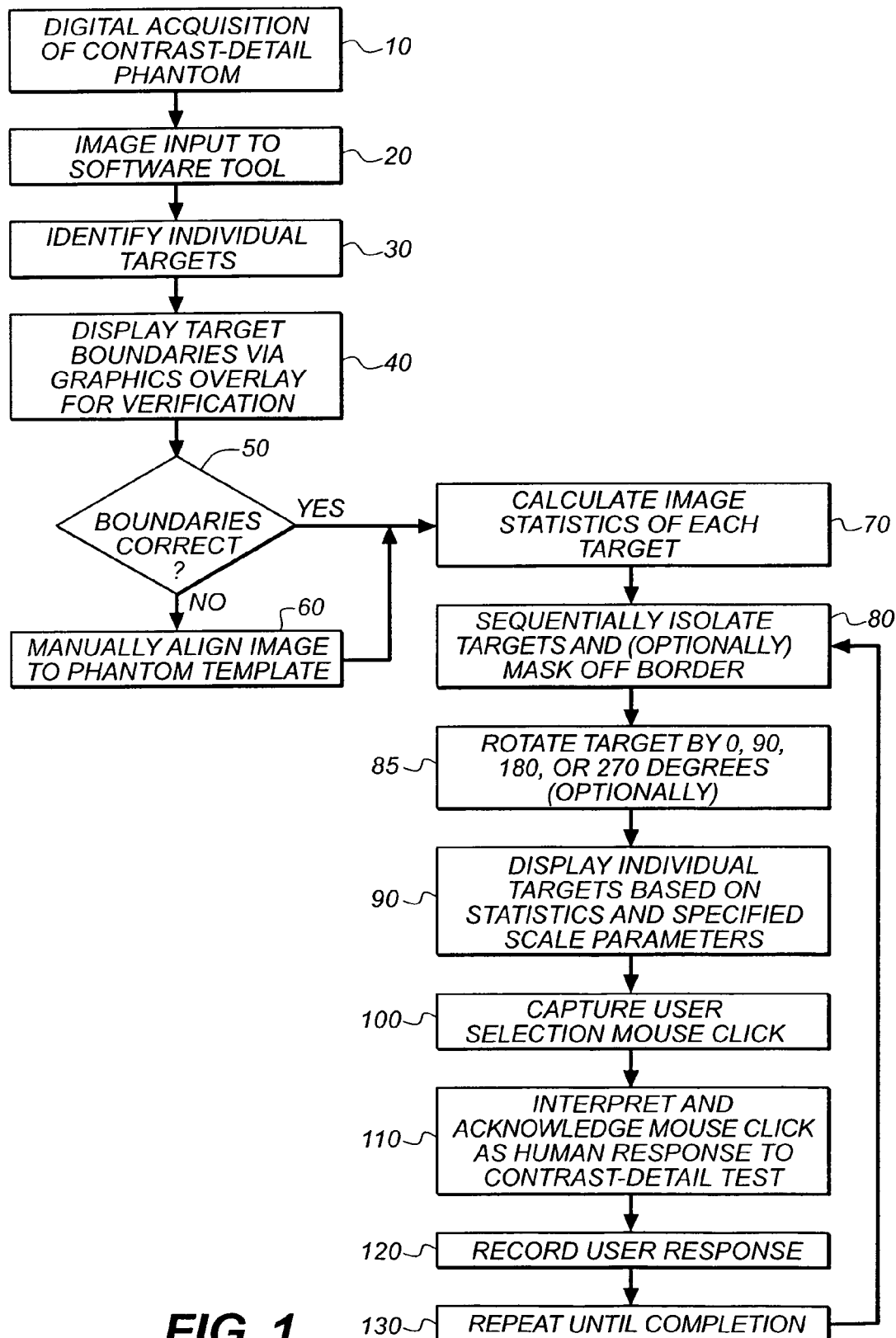
FIG. 1 shows a block diagram of a phantom image presentation system in accordance with the present invention.

The following is a detailed description of the preferred embodiments of the invention, reference being made to the drawings in which the same reference numerals identify the same elements of structure in each of the several figures.

FIG. 1 generally shows a flow diagram of a method in accordance with the present invention to aid in the human visual reading of phantom image data for image quality assessment. Generally, a digital image is registered to a phantom template to generate a plurality of individual targets. The individual targets are sequentially displayed to a user, who is able to control brightness and contrast (e.g., gray-scale display mapping). The user indicates a decision based on the user's visual inspection of the displayed individual target.

More particularly, the image quality verification aid is employed with phantom data acquired in accordance with a pre-specified test procedure (step 10). The acquired data is input for a software tool (step 20) wherein individual grid targets are identified (step 30). At step 40, target boundaries are overlaid to the full phantom image for verification. A user can approve the boundaries or rejects the boundaries at step 50. If the user rejects the boundaries (step 60), a manual alignment to a model of the phantom can be performed to identify individual grid targets. Once the boundaries are approved by the user, the individual grid targets are analyzed (step 70) to compute statistics/characteristics of a region of background pixels. For example, a mean and standard deviation of the background pixels. At step 80, the targets are sequentially physically isolated. Additionally, the border area can be masked, for example, to reduce flare when observing the phantom image. An optional step, shown in FIG. 1 at step 85 can be performed, wherein the isolated target is rotated randomly by 0, 90, 180, or 270 degrees so as to reduce the probability of observer memorization of the target positions.

The individual targets are displayed based on image statistics/characteristics (determined at step 70) and/or on specified scale parameters (step 90).

A human observer then views each isolated target and chooses an appropriate response for the task (step 100). The user's response can be captured electronically, for example, by indicating the choice with a mouse click. Once the selection is captured, it can be interpreted based on the task while an acknowledgement is sent to the observer (step 110). A record of the user's response can be stored in a data file for future analysis (step 120). The steps in sequence from 80 to 120 can then be repeated for each isolated target of the phantom image.

Figure 2:
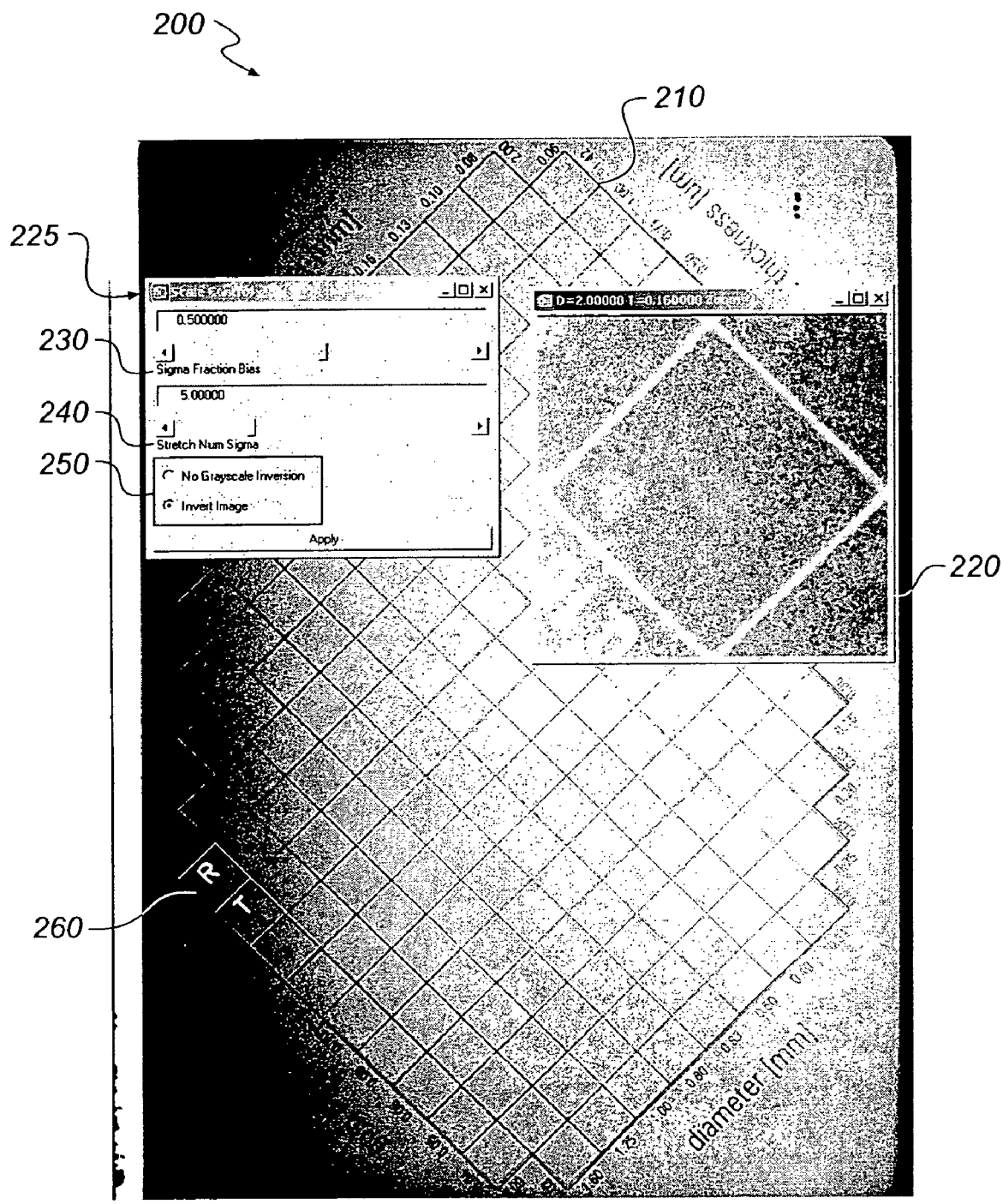
FIG. 2 shows an example of an overlay for boundary verification, isolated target with the results of automated brightness and contrast display, and a user control to adjust the brightness and contrast display parameters.

FIG. 2 shows an exemplary acquired x-ray phantom image 200. More particularly, FIG. 2 shows an acquired x-ray image 200 of an example phantom type (CDMAM for mammography) with an overlay for boundary verification 210.

It is noted that textual information on the phantom image shown in FIG. 2 can be seen, for example, the word diameter (mm)" and corresponding numerical values for diameter. If desire, this textual information can be masked to reduce flare when the user is observing the phantom image and also to further isolate the target.

Overlaid on the phantom image is an enlargement of an isolated target 220 illustrating the results of automated brightness and contrast display. Also illustrated is a user control 225 which can be used by a user to adjust the brightness and contrast display parameters specified as "Sigma" 230 and "Stretch Num Sigma" 240 in addition to an inversion control 250 as offered by embodiments of the present invention. The acknowledgment, as supplied to the user, is represented by the highlighted letters corresponding to any of top, bottom, right or left 260. Acknowledgement can also be supplied with other notations, such as the letter "A" for corner indicated by the observer as "Answered"or by the letter "O" for center indicated by the observer as "No Guess".

Figure 3:
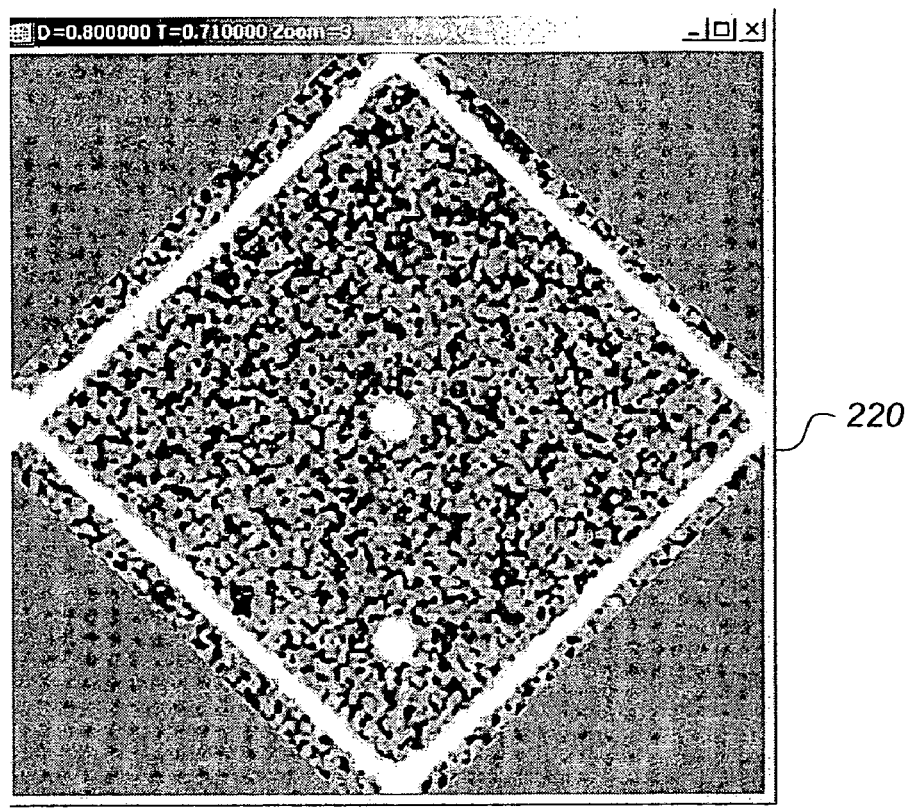
FIG. 3 shows an exemplary isolated target.

FIG. 3 shows an enlargement, for illustrative purposes only, of isolated target 220 illustrating the results of automated brightness and contrast display.

Figure 4:
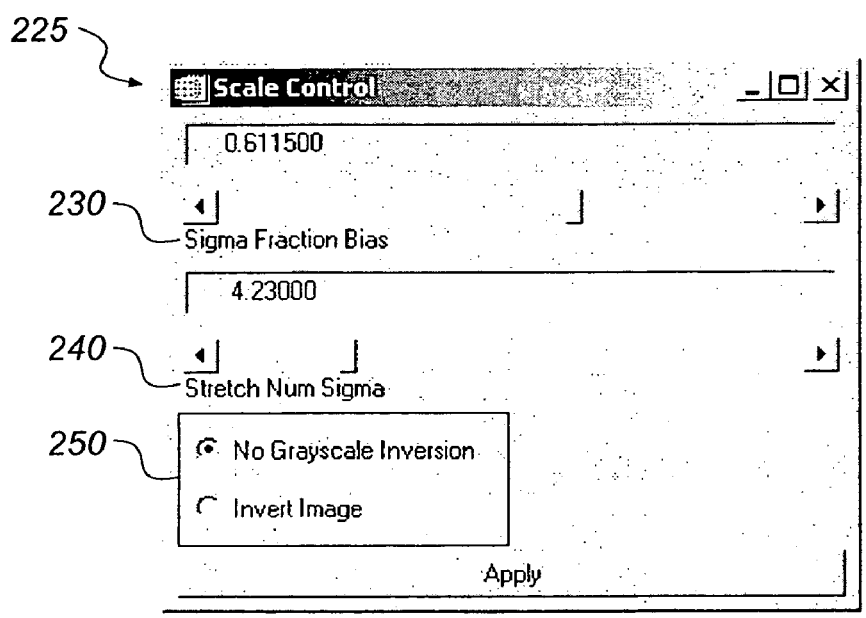
FIG. 4 shows an exemplary user control.

FIG. 4 shows an enlargement, for illustrative purposes only, of user control 225 which can be used to adjust the brightness and contrast display parameters specified as "Sigma" 230 and "Stretch Num Sigma" 240 in addition to an inversion control 250.

Figure 5:
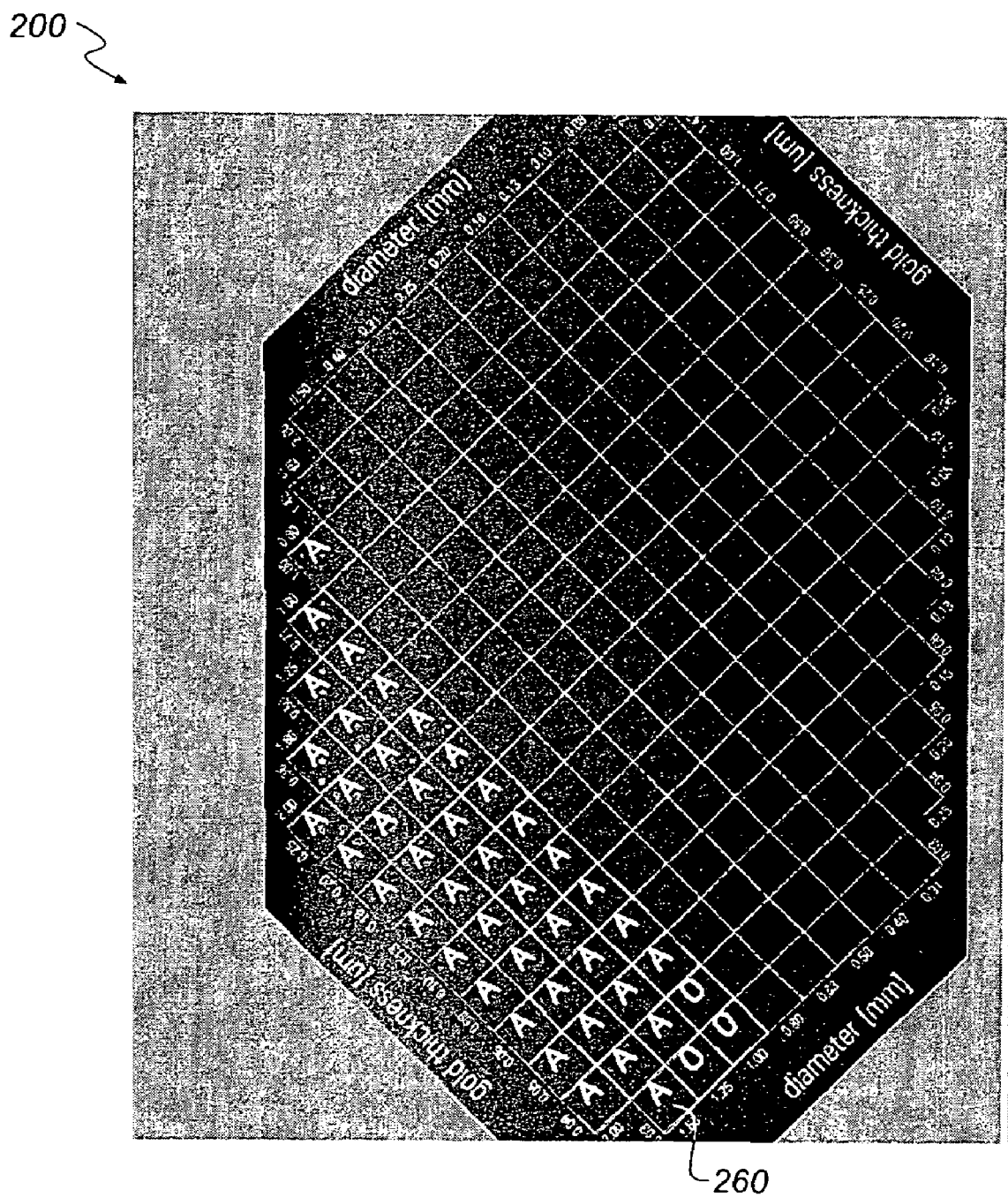
FIG. 5 shows an exemplary phantom image.

FIG. 5 shows another example of a phantom image 220, similar to that shown in FIG. 2. In FIG. 5, the phantom image has been masked. If desired, the other textual information along the edge of the image can be masked. In addition, the acknowledgement is shown with a notation "A" as "Answered"and the notation "O" as "No Guess".

Contrast and brightness are calculated automatically based on the parameters set in "Stretch Num Sigma" 240 and inversion control 250, thereby providing statistical scaling which effectively readjusts the window width and level at each grid target in the phantom. An area/patch of background in each grid target is extracted and the data is assessed to compute the mean and standard deviation of the digital counts. These values (mean, stdev) are used to compute a range of pixels (Low, High) for display of the target, for example:

$F$=Sigma Fraction Bias $0<=F<=1.0$ $N$sig=Stretch Num Sigma $0.1<N$sig$<20$

Bias=$(F-0.5)*(2.0*N$sig$*$stdev$)$

Low=(Bias+mean)$-N$sig$*$stdev

High=(Bias+mean)$+N$sig$*$stdev

The pixel values in an individual target are then linearly mapped such that Low->0 and High->255. If the "Invert Image" box (see element 250) of user control 225 is selected, then those results are subtracted from 255 before the image is displayed.

It is noted that the Low and High values translate to window level and width as follows:

window_level=(Low+High)/2 and window width=(High−Low).

Further handling of the image data can be accomplished using methods/techniques known to those skilled in the art, for example, such as described in the previously referenced references.

All documents, patents, journal articles and other materials cited in the present application are hereby incorporated by reference.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 Digitally acquired phantom image
20 Algorithm data input
30 Individual target identified
40 Graphical overlay for target verification
50 Human observer verification of target boundaries
60 Manual alignment upon automated detection failure
70 Image target statistics calculations
80 Physical target isolation
85 Target rotation (optional)
90 Individual target display
100 User selection capture
110 Mouse click interpretation and acknowledgment
120 Recording of user response
130 Repeat loop for each target from part 80
200 Full presentation of phantom image
210 Overlay for target verification
220 Isolated target with automated brightness and contrast display
225 User control
230 Brightness control
240 Contrast control
250 Grayscale inversion control
260 acknowledgement

What is claimed is:

1. A method for visual assessment of a phantom image, comprising the steps of:
   registering a digital image to a phantom template to generate a plurality of individual targets;
   sequentially displaying each individual target to a user for visual assessment;
   allowing display control adjustment of the displayed individual target; and
   allowing the user to indicate at least one assessment of the displayed individual target.

2. The method of claim 1, wherein the display control adjustment includes brightness and contrast adjustment.

3. The method of claim 1, wherein the individual targets are rotated by 0, 90, 180, or 270 degrees.

4. The method of claim 1, further comprising the step of storing the at least one assessment for each of the plurality of individual targets.

5. The method of claim 1, further comprising the step of masking at least a portion of the digital image.

6. A method for human visual reading of image data for image quality assessment, comprising the steps of:
   registering a digital image to a phantom template to generate a plurality of individual targets;
   determining characteristics of the digital image corresponding to each of the plurality of individual targets;
   sequentially displaying each individual target to a user based on the determined characteristics;
   allowing display control adjustment of the displayed individual target; and
   allowing a user to indicate at least one assessment of the displayed individual target.

7. The method of claim 6, wherein the display control adjustment includes brightness and contrast adjustment.

8. The method of claim 6, wherein the individual targets are rotated by 0, 90, 180, or 270 degrees.

9. The method of claim 6, further comprising the step of storing the at least one assessment for each of the plurality of individual targets.

10. A method for visual assessment of a phantom image, comprising the steps of:
    registering a digital image to a phantom template to generate a plurality of individual targets;
    sequentially displaying each individual target to a user for visual assessment;
    allowing display control adjustment of the displayed individual target;
    allowing the user to indicate at least one assessment of the displayed individual target; and
    prior to the step of sequentially displaying the individual target, randomly rotating the individual targets.

11. A method for human visual reading of image data for image quality assessment, comprising the steps of:
    registering a digital image to a phantom template to generate a plurality of individual targets;
    determining characteristics of the digital image corresponding to each of the plurality of individual targets;
    sequentially displaying each individual target to a user based on the determined characteristics;
    allowing display control adjustment of the displayed individual target;
    allowing a user to indicate at least one assessment of the displayed individual target; and
    prior to the step of sequentially displaying the individual target, randomly rotating the individual targets wherein each rotated individual target is sequentially displayed to a user.

* * * * *